US006385176B1

United States Patent
Iyengar et al.

(10) Patent No.: US 6,385,176 B1
(45) Date of Patent: May 7, 2002

(54) COMMUNICATION SYSTEM BASED ON ECHO CANCELER TAP PROFILE

(75) Inventors: Vasu Iyengar; James Charles Popa, both of Allentown, PA (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/090,733

(22) Filed: Jun. 4, 1998

(51) Int. Cl.[7] .................................................. H04B 3/20
(52) U.S. Cl. ........................................ 370/286; 379/406
(58) Field of Search ................................ 370/286, 275, 370/276, 287, 288, 297, 289, 290, 291, 296; 379/24, 400, 406, 407, 409, 410, 444, 404, 411, 3, 78, 88.08

(56) References Cited

U.S. PATENT DOCUMENTS

| 4,464,545 A | 8/1984 | Werner |
| 4,959,857 A | 9/1990 | Erving et al. |
| 5,007,046 A | 4/1991 | Erving et al. |
| 5,463,618 A | * 10/1995 | Furukawa et al. .......... 370/290 |
| 5,590,121 A | 12/1996 | Geigel et al. |
| 5,600,714 A | 2/1997 | Eppler, Jr. et al. |
| 5,612,996 A | * 3/1997 | Li .............................. 370/390 |
| 5,631,899 A | 5/1997 | Duttweiler |
| 5,646,990 A | * 7/1997 | Li .............................. 370/390 |
| 5,668,794 A | * 9/1997 | McCaslin et al. ........... 370/288 |
| 5,982,755 A | * 11/1999 | Forrester et al. ............ 370/278 |

\* cited by examiner

Primary Examiner—Douglas Olms
Assistant Examiner—Phirin Sam
(74) Attorney, Agent, or Firm—Darby & Darby (57) ABSTRACT

A controller and a method for controlling the amount of loss in signal paths of a communication system are disclosed. The method includes sampling the impulse response of an echo cancelling circuit, detecting an abnormal signal condition by comparing the impulse response to a reference, and inserting loss into a first signal path when an abnormal signal condition is detected. One controller configuration for adjusting the amount of loss in the signal paths of a communication system has an adjustable attenuator in the signal path having a control signal input, a memory element which stores a reference, and a comparator having one input connected to the memory of the echo canceler circuit which samples the impulse response, another input connected to the memory which stores the reference, and an output connected to the control signal input of the attenuator. Another controller configuration has a program running on a digital signal processor within the communication system, with the program analyzing the impulse response of the echo canceler so as to generate a control signal, and a call programmable gain attenuator in the signal path which is responsive to the control signal from the program to selectively insert or remove loss into the signal path.

27 Claims, 8 Drawing Sheets

COMMUNICATION SYSTEM BASED ON ECHO CANCELER TAP PROFILE

FIELD OF THE INVENTION

The present invention relates to circuits for providing duplex telecommunication over communication lines in the context of a communication system, and more particularly, to a digital echo cancelling speakerphone.

BACKGROUND OF THE INVENTION

One aspect of face-to-face human communication is the ability of two parties to both talk and be heard at the same time. The ability to both speak and be heard at the same time has presented technical complications in telecommunication systems. For example, with respect to radio frequency carrier wave transmissions, if two parties to a conversation transmit at the same time, the signals will interfere with each other causing beat frequency oscillations, feedback and the like. Systems which solve this problem and thus allow the parties to the conversation to both speak and be heard at the same time are referred to as duplex systems.

Until the introduction of speaker telephones, virtually all telephones were duplex systems. Generally, such telephone systems during this period included the equivalent of a pair of variable resistance carbon microphones and a pair of electromagnetic earphones, connected in series. As one caller spoke over the line, a diaphragm coupled to a carbon powder compartment in the microphone caused successive compressions to be exerted against the carbon powder, thus varying the electrical resistance of the compartment. This in turn varied the current passing through the series circuit thereby modulating the current passing through the series combination to generate the telephone signal. This modulated signal, modulated at the actual frequency of the voice signal being transmitted, was present at the telephone set of both participants to the telephone conversation. This system, which continues in use in principle unchanged from the original instruments developed by Bell in the 1870's, inherently has a duplex characteristic. Duplex communication is achieved because the audio frequencies involved do not cause unacceptable interference with each other and because the gain of the feedback loop between the carbon microphone and the earphone is less than unity.

With the advent of speaker telephones, it became necessary to introduce into the telephone instrument an audio amplifier for amplifying the audio signals received from the telephone central office to a level that is sufficient to drive a loudspeaker. This immediately presented the problem of preventing feedback between a microphone adjusted for sensitivity to the voice of a person, who is not speaking directly and proximately into it, while making the system unresponsive to audio signals introduced into the environment by the loudspeaker which could be very close to the microphone. To somewhat better understand this problem, it must be kept in mind that the telephone is a two-wire system used to carry both the transmitted and received signal. If the transmitted signal is thus allowed to be amplified by the amplifier which amplifies the received signal which is also carried on the same two wires, ambient noise will be amplified and feedback oscillations are likely to ensue at normal levels of speaker amplitude which results generally in loop instability.

One approach to this problem was embodied in speaker telephone systems that included separate microphones and loudspeakers, both of which had some directional characteristic designed to ensure that audio on the loudspeaker would be loud enough for the telephone user to hear while at the same time having, perhaps, less audio field strength at the location of the microphone. In addition, the solution involved a microphone whose directional sensitivity characteristic was directed toward the mouth of the individual using the system with minimal sensitivity in the vicinity of the speaker. Thus, design objectives involved reducing the gain of the feedback loop between the microphone and the speaker to less than unity, with the volume control for the system set at a level that would allow easy intelligibility of the signal.

Such an approach does not, in principle, provide a commercially acceptable level of performance. For example, such an approach imposes limits on the location of the parties to the conversation, maximum loudspeaker volume and minimum user voice levels. Another approach to this problem, and one which is more widespread in modern communication systems, is the sacrifice of duplex operation for relatively trouble-free speaker telephone operation. Generally, these systems incorporate an electronic switch which turns off the speaker when the user is speaking or disables the local microphone when the party at the other end of the telephone is speaking. Alternatively, loss can be inserted into the receive path when the user is speaking and loss can be inserted in the transmit path when the party at the other end is speaking. Such inserted losses are generally complementary in nature, that is, the loss is completely removed from one path and inserted into the other path. This loss is referred to "switched loss" in the speaker telephone system and its amount is such that the overall loop gain is less than unity. In such speaker telephone systems, the degree of switched loss that is required varies directly with the magnitude of the acoustic and line echo path coupling (that is, the signal amplitude in such paths).

The determination of whether a particular telephone is in the transmit or receive mode has been made in such systems, for example, by monitoring the magnitude of the signals at each end of the telephone conversation and selecting the stronger of the two. One approach to the determination of whether a particular speakerphone is in the transmit, receive, or idle state is disclosed in U.S. Pat. No. 5,007,046 of Erving et al., the disclosure of which is hereby incorporated by reference in its entirety.

More recently, a so-called "hybrid" technology has been implemented which resolves some of the difficulties attendant with the speakerphone feedback problem, by reducing the line feedback coupling. The hybrid electronic circuit operates by approximating the complex impedance of the telephone system to produce a cancellation signal. When added to the signal on the telephone system (comprising both the transmitted and received signal), a third signal results which (ideally) includes only the received signal. The third signal is then sent to the audio amplifier and loudspeaker of the speaker telephone system generally free of echo.

Echo cancelling speaker telephones provide yet another solution to the problem by using acoustic and "hybrid" or line echo cancelers to reduce the acoustic and hybrid coupling, respectively. In particular, the hybrid echo canceler identifies the linear component of the hybrid echo path impulse response and uses this to digitally filter the line out signal in order to create a replica of the hybrid echo. This replica signal is then subtracted from the line in signal thus reducing the effect of the hybrid echo. Similarly, the acoustic echo canceler identifies the linear component of the acoustic echo path impulse response and uses this to digitally filter the speaker out signal in order to create a replica of the acoustic echo which is then subtracted from the mike signal to reduce the effect of the acoustic echo. With reduced acoustic and hybrid echo, less switched loss is required, and this enhances the extent of full-duplex communication.

A problem remains, however, in maximizing overall loop gain when the tap state of a canceler has an abnormal setting. Our invention addresses that need using an echo cancelling tap profile to continually adjust the amount of loss in a signal path to maintain loop stability or to better isolate a coupled signal.

SUMMARY OF THE INVENTION

Our invention concerns, in one aspect, a method for controlling the amount of loss in signal paths of a communication system. Our method includes the steps of sampling the impulse response of an echo cancelling circuit, detecting an abnormal signal condition by comparing the impulse response to a reference, and inserting loss into a first signal path when an abnormal signal condition is detected. A peak value within the impulse response, or an interval thereof, may be identified so that the detecting step causes the peak value to be compared to the reference, which may be the peak value from a prior sampled impulse response, e.g., an immediately preceding impulse response or interval thereof.

Our invention also concerns a controller for adjusting the amount of loss in the signal paths of a communication system of the type which has an echo cancelling circuit including a memory. The controller includes an adjustable attenuator in the signal path having a control signal input. The controller also has a memory element which stores a reference and a comparator having one input connected to the memory of the echo canceler circuit which samples the impulse response, another input connected to the memory which stores the reference, and an output connected to the control signal input of the attenuator. In operation, the elements of the controller cooperate to compare the signals at the inputs to the comparator so as to output a control signal which selectively adjusts the attenuator to insert or remove loss in the signal path.

Further, our invention concerns a controller for maintaining loop stability in the signal path of an echo cancelling communication system circuit is disclosed. The controller in accordance with this aspect of our invention includes a program running on a digital signal processor within the communication system, with the program analyzing the impulse response of the echo canceler so as to generate a control signal. The controller also has a call programmable gain attenuator in the signal path which is responsive to the control signal from the program to selectively insert or remove loss into the signal path.

In another aspect, our invention concerns a voice command recognition system which utilizes an impulse analyzing control circuit as described above.

BRIEF DESCRIPTION OF THE DRAWINGS

The foregoing and other features and advantages of our present invention will be more readily apparent from the following detailed description when read in conjunction with the accompanying drawings; wherein.

DETAILED DESCRIPTION

Figure 1:
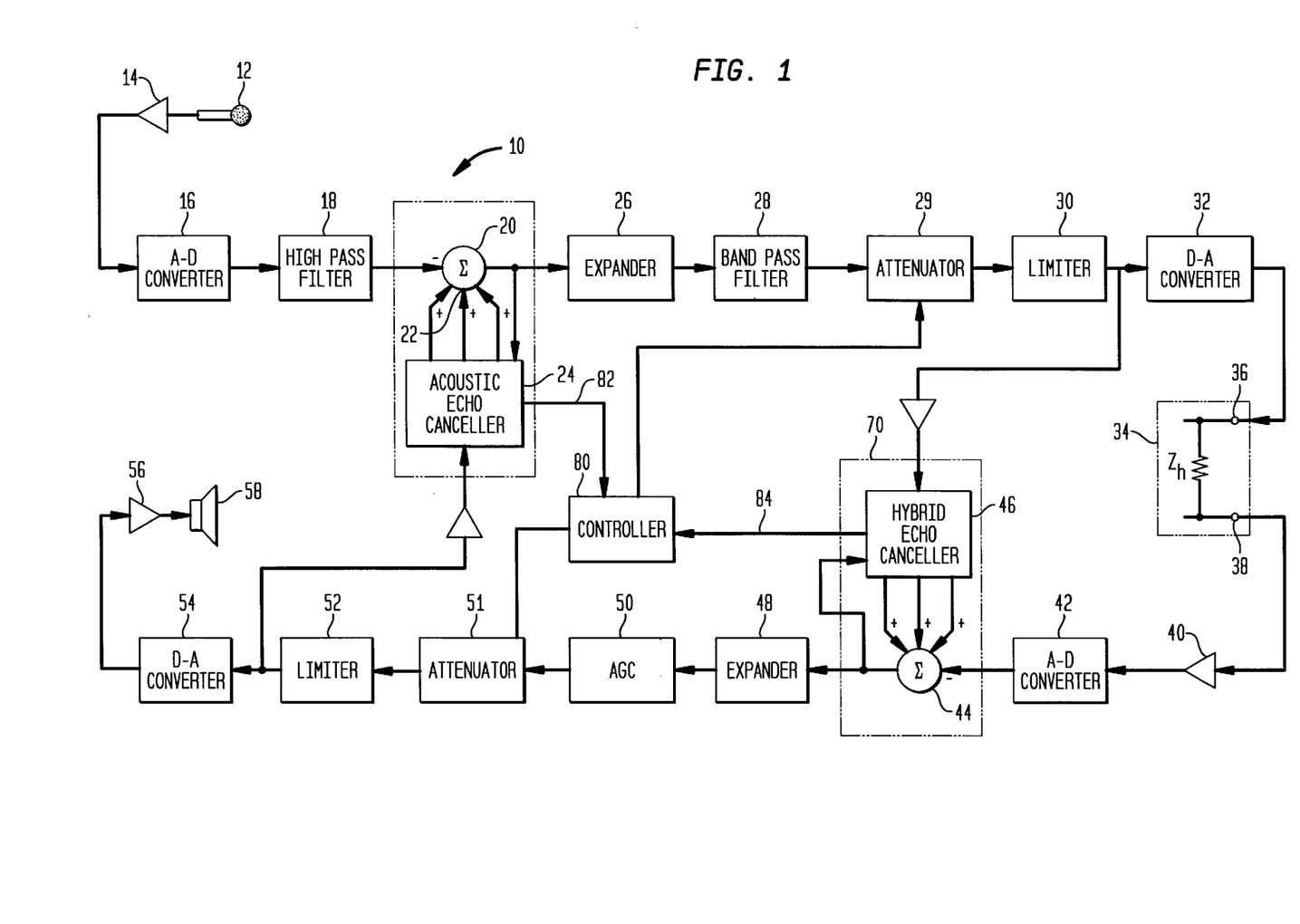
FIG. 1 is a block diagram of the inventive communication system.

Turning to FIG. 1, an exemplary embodiment of a communication system in accordance with our invention is illustrated as a speaker telephone system. The invention, however, has industrial applicability in other communication systems including one-way communication systems in which an audible message is isolated from other signals for independent recognition or device control purposes, as described in more detail below.

Speaker telephone system 10 of a first embodiment of our invention includes a microphone 12 that receives the voice of an individual (not shown) when the system 10 is in use. The output of the microphone 12 is sent through an appropriate amplifier 14 to an analog-to-digital converter 16.

The output of analog-to-digital converter 16 is sent to a microprocessor or DSP which is programmed, in a manner well known in the art, to act as a high pass filter 18 having a low frequency cutoff of, for example, 100 hertz High pass filter 18 can be, for example, an eight pole filter. The circuit of FIG. 1 alternatively can be constructed as a conventional analog circuit yet be functionally identical and provide substantially the same result.

High pass filter 18 removes low frequency sounds, which otherwise would enter the system 10 through the microphone 12, such as air conditioner rumble, footsteps and other sounds beyond the normal ranges of voice frequencies. The output of high pass filter 18 is then sent to a digital adding circuit 20. Adding circuit 20 has a second input 22 which is driven by an acoustic echo canceler 24, described below. Of course, a band pass filter can be provided, in lieu of or in addition to the high pass filter 18, to limit the range of frequencies provided to the adding circuit 20.

The output of digital adder 20 is, in turn, coupled to a gate expander 26. Expander 26 reduces signals below a desired minimum threshold thereby reducing any residual low volume noise. Above the threshold, signals are output at the same amplitude at which they are input. For signals below the threshold of expander 26, they are reduced by an amount proportional to the amount below the threshold voltage that their amplitude takes. For example, signals just below the threshold will be slightly reduced while signals far below the threshold will be very greatly reduced in amplitude at the output of the expander 26.

Figure 3:
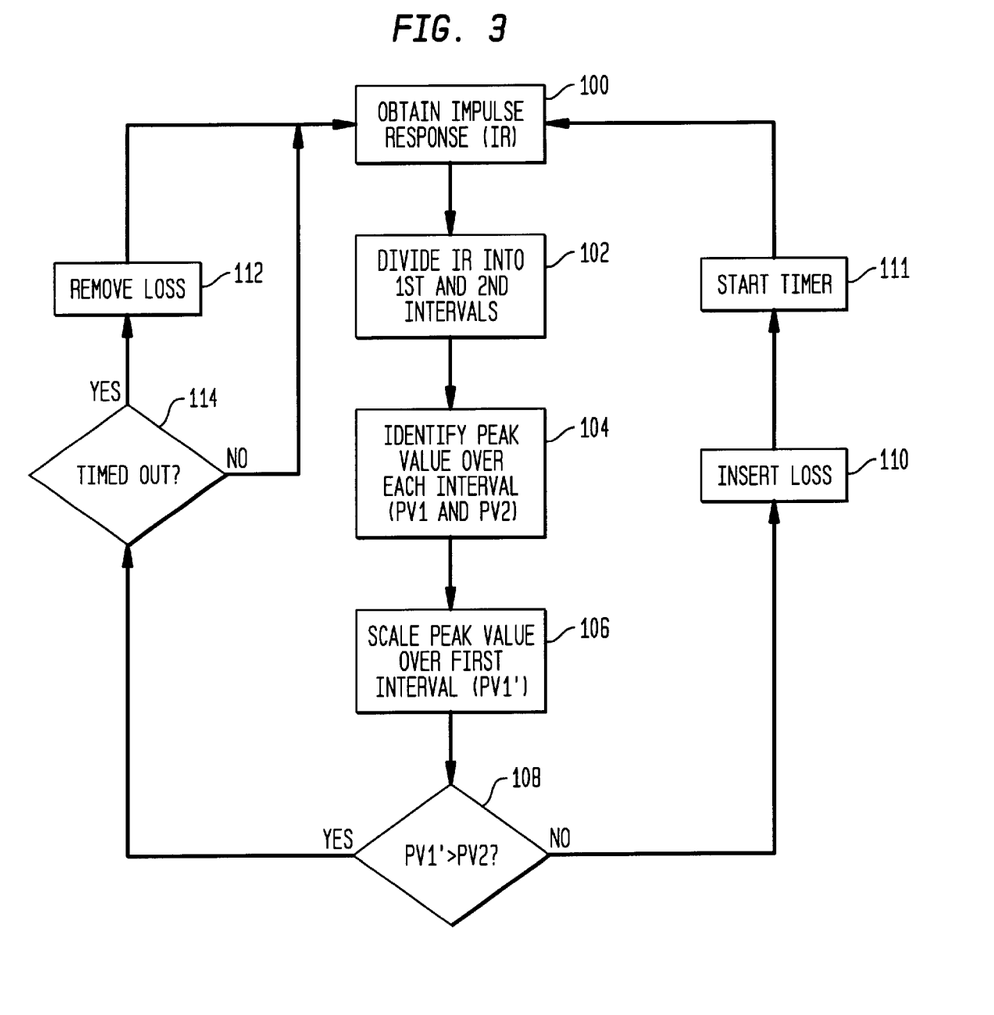
FIG. 3 is a flow chart of steps implemented by the telephone system of FIG. 1 in accordance with one aspect of our invention.
Figure 4:
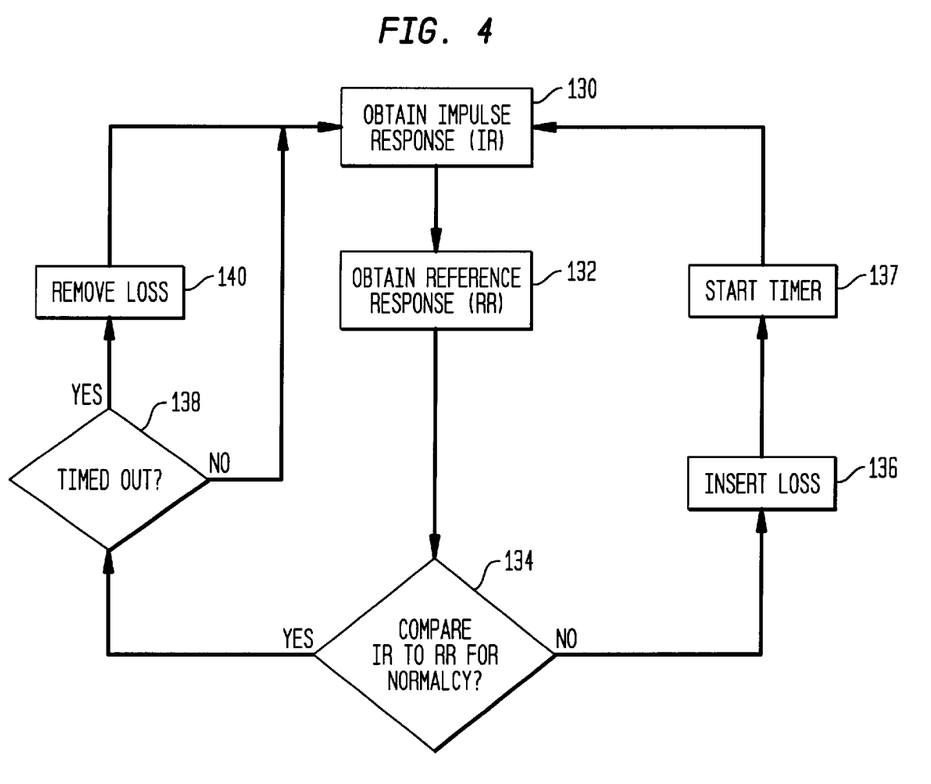
FIG. 4 is a flow chart of steps implemented by the telephone system of FIG. 1 in accordance with another aspect of our invention.
Figure 5:
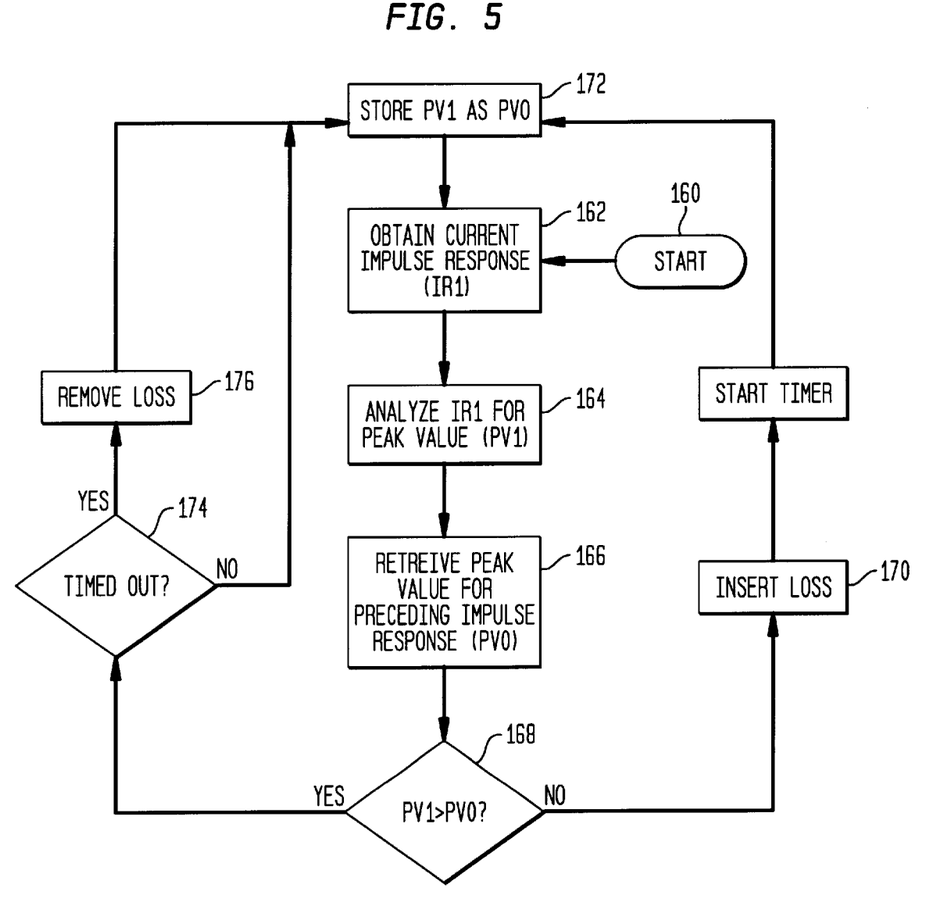
FIG. 5 is a flow chart of steps implemented by the telephone system of FIG. 1 in accordance with another aspect of our invention.

The output of expander 26 is sent to a bandpass filter 28 which, like expander 26, is also a digital device (e.g., a programmed processor) and is designed to have a bandpass between about 300 hertz and about 3.4 kilohertz. The output of bandpass filter 28 has a gain level which is adjustable, in accordance with our invention, by an attenuator or switched loss element 29 (sometimes referred to as a call programmable gain attenuator). The switched loss element 29 changes the overall gain in the transmit path in response to signals from a controller 80, the operation of which is described below in connection with the flow diagrams herein (FIGS. 3–5). The signal from the switched loss element 29 is then sent to a limiter 30 which limits the maximum amplitude of any signals received from the bandpass filter 28. Limiter 30 is also a digital circuit such as a microprocessor, DSP, or the like. The connection of expander 26, bandpass filter 28, switched loss element and limiter 30, and possibly other audio processing circuits before the input to an echo canceler driver 72 assists in limiting the transmitted bandwidth of the speakerphone to an acceptable range. The output of limiter 30 is then sent to a digital-to-analog converter 32 for conversion to an analog signal which is then sent over a two wire telephone system 34 by way of the two wire telephone systems input terminal 36.

Signals received by the speaker telephone system 10 from the two wire telephone system 34 appear at the two wire telephone system output terminal 38 and propagate through a received signal path. Such signals are provided to the received signal input of the speaker telephone system 10, and, after suitable amplification by an amplifier 40, are converted to a digital stream by an analog-to-digital converter 42. The output of the analog-to-digital converter 42 is provided to digital adder 44. Digital adder 44 has plural other inputs which are connected to the outputs of a hybrid echo canceler 46. The output of adder 44 is, in turn, coupled to a gate expander 48, which suppresses low amplitude noise below a threshold by reducing signals in an amount proportional to the extent to which their amplitude is below the threshold. For example, if signals are just below the threshold, they are very slightly reduced in amplitude, whereas if signals are very far below the threshold, they are greatly reduced in amplitude.

The output of the expander 48 is sent to the input of an automatic gain control circuit (AGC) 50. AGC circuit 50 provides an output which is substantially the same in amplitude regardless of whether the input signal was from the speaker telephone system 10 or a lower amplitude signal from a remote telephone at the other end of the two wire telephone system 34. The output of AGC circuit 50 is provided to an attenuator or switched loss element 51 in the receive path which changes the gain of the signals from the AGC 50 in response to signals from the controller 80, described below. The output of the switched loss element 51 is then sent to a limiter 52 which prevents signals from exceeding a preset limit and overdriving the system. The output of limiter 52 is provided to a digital-to-analog converter 54 for converting the signals to an analog signal which is then amplified by an amplifier 56 to drive an output loudspeaker 58.

Insofar as the expander 48, the AGC circuit 50, the switched loss element 51 and the limiter 52 operate in the digital domain, all of these circuits must be digital circuits such as a programmed processor. Likewise, as noted above, the high pass filter 18, the expander 26, the bandpass filter 28, the switched loss element 29, the limiter 30 and the adders 20 and 44, also operate in the digital domain and are digital circuits. Moreover, as noted above, all of these circuits, in principle, can be replaced by analog circuits and substantially similar operation can be achieved, but in such case, the rest of the circuit would probably also be analog and the conversion into digital performed by the analog-to-digital converters and the inverse conversion by the digital-to-analog converters would not be required.

As understood in the art, the two-wire telephone system 34 of the telephone company has an impedance $Z_h$ (see FIG. 1). A consequence of this finite impedance is that signals from the microphone 12, provided at the output of digital-to-analog converter 32 are coupled through the impedance $Z_h$ to the received signal input of the speaker telephone 10 and amplified by the amplifier 40. Unfortunately, such signals conventionally are reproduced in some form at the speaker 58, thereby completing an undesirable feedback loop through microphone 12.

Figure 2:
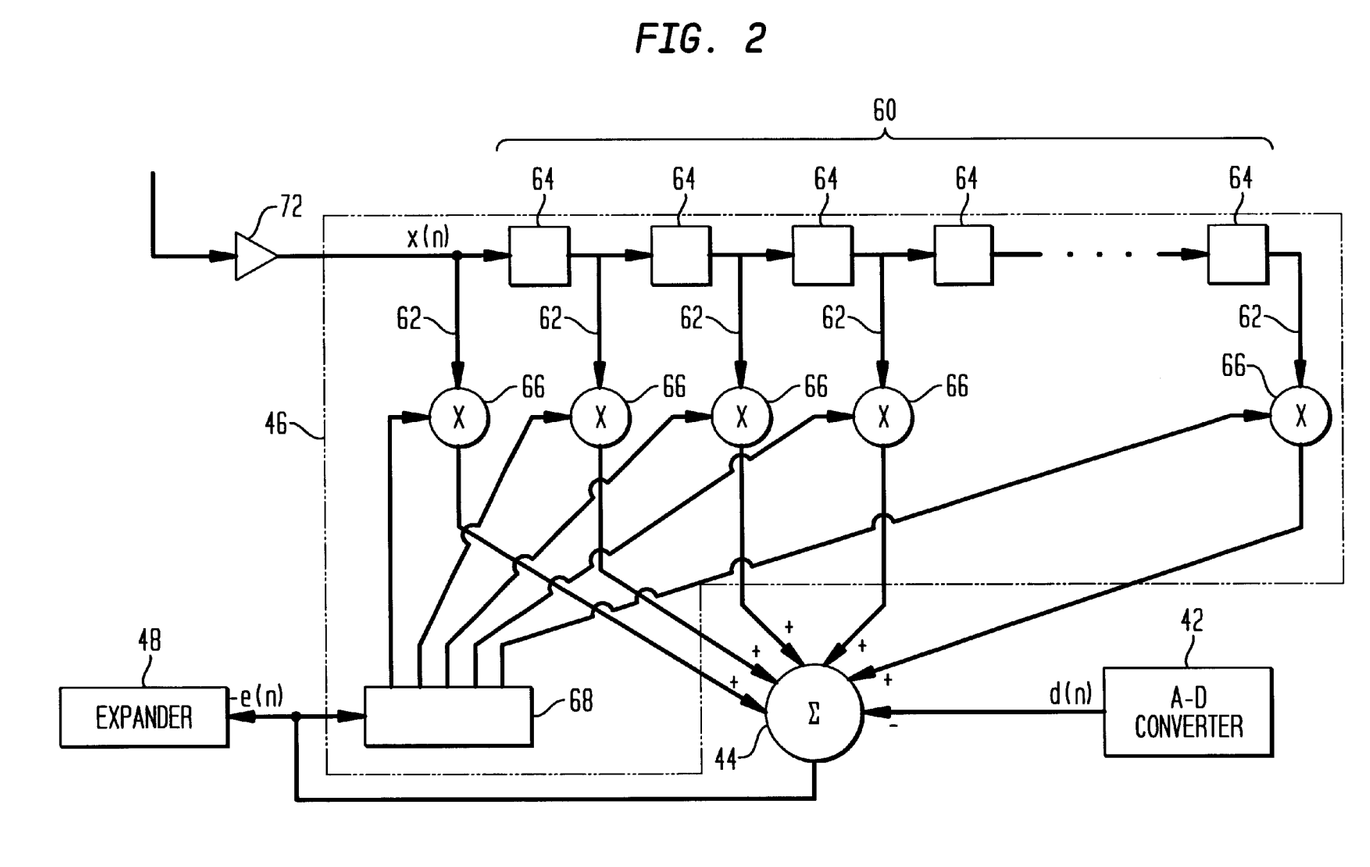
FIG. 2 is a block diagram showing the hybrid model of FIG. 1.

It has been recognized that the characteristics of the two-wire telephone system 34 may be viewed as an echo-producing system in which all signals present at its input terminal 36 appear finite periods of time later at its output terminal 38. Thus, a device (such as hybrid echo canceler 46) which receives input signals and produces cancellation signals having the same waveform but different amplitudes delayed by specific discrete time periods should have the effect of substantially canceling the input signal at terminal 36 from the output waveform at terminal 38. The HEC may be modeled as a delay line having an input and an output, a number of output taps corresponding to different delays each of which has an independently variable signal amplitude (by way of scaling factors stored in memory 68 and applied by scaling circuits 66, as illustrated in FIG. 2), and a summing device for summing all of the amplitude-varied tap outputs. Suitable DSP devices for implementing the HEC 46 include the Lucent 16xx series of 16 bit fixed point DSPs, available from Lucent Technologies, Inc., Murray Hill, N.J., including for example, the 1605 and 1609 DSPs.

As used herein, an impulse response is the response of a linear system to a pulse. In the time domain, an impulse response is a continuous signal. However, in the digital domain, the impulse response can be represented as a finite impulse response, that is, a vector of values that serve as coefficients or weights to a function. Each coefficient is usually referred to as a "tap weight," since the weights are applied to signals in a tap delay line. The tap state of a system models a particular impulse response of the loudspeaker or hybrid echo to the microphone with the signal strength of each of the delayed signal components over a finite time period being scaled or modeled with a scaling factor, as discussed next.

As can be seen in FIG. 2, hybrid echo canceler 46 comprises a delay line 60 having a plurality of taps 62 and individual delay elements 64. The output of taps 62, which represent a plurality of echo outputs are sent to scaling circuits 66. The scaling circuits each receive a scaling factor (also known as a tap value or coefficient) from memory 68 in the chip. The scaled echo outputs are then sent to adder 44 which acts as a difference circuit: it subtracts an input signal from the output of ADC 42 (having signals received from the two-wire telephone system 34 and signals coupled from the microphone 12 through finite impedance $Z_h$) from a plurality of inputs which have the scaled echo/tap outputs.

The structure which is illustrated in FIG. 2 in and of itself forms no part of our invention. The AEC 24 may be constructed the same as the HEC 46, and neither does the construction of the AEC 24 form a part of our invention.

In operation, the signal in the transmit path is sampled from the output of limiter 30 and sent to an amplifier 72 to DSP 70, passing through delay line 60 within the chip to result in a series of delayed signals which function as artificial echoes. These echoes are sent to their respective scaling circuits 66 which in turn provide them to digital adder 44 which produces an output by adding all the scaled echoes together and subtracting from the total of all the scaled echoes the digital receive signal, d(n), provided at the output of analog-to-digital converter 42.

DSP 70 has the characteristic of following an algorithm which varies the scaling factors of scaling circuit 66 until the output −e(n) of digital adder 44 is at a minimum. Typically, a normalized LMS (least mean square) algorithm is used, as understood by those of skill In the art. Insofar as the delays and amplitudes associated with the numerous echoes in the modeled characteristics of two-wire telephone system 34 are substantially constant, the DSP 70 will be able to reduce the amount of the transmitted signal x(n) from the microphone 12 almost to zero, once the scaling factors associated with scaling circuit 66 have values (tap states) which match the characteristics of two-wire telephone system 34. While the DSP 70 will continually attempt to reduce all signals from the microphone 12 to zero, the received voice signal entering the speaker telephone 10 at two-wire telephone system output 38 remains unaffected.

DSP 70 is able to determine whether its output −e(n) has reduced the transmitted signals substantially to zero because that output is compared to the transmitted signal x(n) as illustrated in FIG. 1, thus ensuring that d(n) has had any remnants of the transmitted signal from the microphone 12 removed from it before passing to expander 48 in the form of signal −e(n).

In like manner, remnants of the received signal d(n) are subtracted out from the microphone signal by the acoustic echo canceler 24. Specifically, a digital version of the signal which drives speaker 58 is supplied to the acoustic echo canceler 24 by way of amplifier 76. Consequently, audio signals transmitted along paths directly from speaker 58 to microphone 12, or indirectly from speaker 58 to microphone 12 (by first reflecting against various objects in the room where the speaker telephone 10 is located) are canceled. Such undesirable signals are actual physical echoes and are canceled by the delay line structure of echo canceler 24 whose various scaled tap states correspond to the various paths described above. Such paths may be numerous, corresponding to the various reflection surfaces provided by objects in the room, various portions of the walls of the rooms, individuals in the room, and so forth.

In principle, both the acoustic echo canceler 24 and the hybrid echo canceler 46 can, without assistance, during use, adapt to both initial conditions and to changes in conditions in both the room and the two-wire telephone system. The acoustic echo canceler 24 reduces the effect of acoustic coupling between the speaker and the microphone in the speakerphone enclosure, and the hybrid echo canceler 46 reduces the effect of reflections from the hybrid.

In accordance with our invention, abnormal conditions are detected by a controller 80, described below, and the gain in the active signal path is reduced by one of the attenuators 29 and 51, to maintain loop stability until the abnormal condition is resolved. The abnormal condition is detected by the controller 80 by monitoring, over signal lines 82 and 84 which extend between the controller 80 and the AEC 24 and HEC 46, any changes in the tap weights stored in the memory 68 of the cancelers. The attenuator 29 is employed to control the gain in the transmit path while the attenuator 51 in accordance with our invention, is employed to control the gain in the receive path. The control signals generated by the controller 80 preferably control the attenuators 29 and 51 in a complementary manner. In other words, as loss is switched into one path (e.g., the transmit path), an equal amount of loss is removed from the other path (e.g., the receive path in this example). In response to the signals provided to the controller 80, and also in response to the passage of time as noted by a counter, the degree of additional switched loss introduced by the attenuators 29 and 51, in accordance with our invention, is dynamically and continuously adjusted in response to changes in the impulse response.

The controller 80 includes conventional circuitry, along with suitable taps into the transmit and receive signal paths (not shown), to identify the active signal path, that is, for determining whether the speaker telephone 10 is in the transmit state or receive state. In the transmit state, the active signal path is from the microphone 12 to the DAC 32. In the receive state, the active signal path is from the amplifier 40 to the speaker 58. The determination of the state of operation of the speaker telephone 10 forms no part of our invention; a suitable technique is disclosed in the aforesaid U.S. Pat. No. 5,007,046 patent, particularly with regard to FIGS. 7–10 and the discussion thereof. The controller 80 also includes conventional circuitry for determining the overall gain in the loop. Such circuitry measures the performance of the canceler, for example, as a ratio of the magnitude of the input and output signals, and when cancellation is effective, the overall gain is set high, or the switched loss of the system is reduced accordingly. Again, such circuitry is not a part of the present invention. The controller preferably is implemented as a digital circuit.

Initially, the tap state of both the AEC 24 and the HEC 46 are set with zero tap values. (The tap values are reset after each telephone call because the line impedance $Z_n$ varies from call to call at the terminal connections). The cancelers are then trained, preferably using a normalized least means square ("LMS") update algorithm, a standard technique in the art. The HEC 46 is trained by the near end speaker 58, i.e., when the speakerphone is in a transmit state. The AEC 24 is trained by the far end speaker, i.e., when the speakerphone is in the receive state. To prevent tap drift, the update algorithm conventionally is inhibited so that the tap values are not updated during double talk situations. During the time that the cancelers 24 and 46 are initially trained, loss is inserted into the inactive signal path by one of the attenuators 29 and 51 similar to a half duplex speakerphone to temporarily maintain loop stability. According to our invention, as the cancelers are trained by the update algorithm, the amount of cancellation in the transmit and receive paths is monitored so that the amount of loss switched into the inactive path can be reduced in proportion to the degree to which the cancelers have been trained. If the performance of the cancelers is monitored in terms of the number of decibels of cancellation achieved, the amount of loss in the system can be decreased by a corresponding number of decibels (in terms of power attenuation) while maintaining stability. As a consequence, less and less switched loss is inserted into the inactive signal path over time by the attenuators 29 and 51, and a higher level of performance is achieved and maintained.

In operation, the tap weights of the cancelers are continuously updated by the update algorithm to cancel echoes that otherwise would be introduced from the room or hybrid. A problem arises, for example, when the cancelers are trained in response to narrow band signals such as a dial tone or a busy tone. Training in response to such signals causes the tap weights to increase in an abnormal manner (a few of the coefficients becoming large and the others becoming relatively small), resulting in effective cancellation of the narrow band signal but little or no cancellation of the broad band of frequencies over which the speaker telephone 10 operates, e.g., 300 hertz to 3.4 kilohertz. For example, if the AEC 24 were trained in response to a call progress signal (e.g., a dial tone or a busy tone), it will effectively cancel only that frequency. By way of illustration, the dial tone signal in Japan is 400 hertz. Were the AEC 24 trained in response to that tone, the potential for loop instability would exist with regard to all other frequencies in the operative band of the speaker telephone 10.

Figure 6:
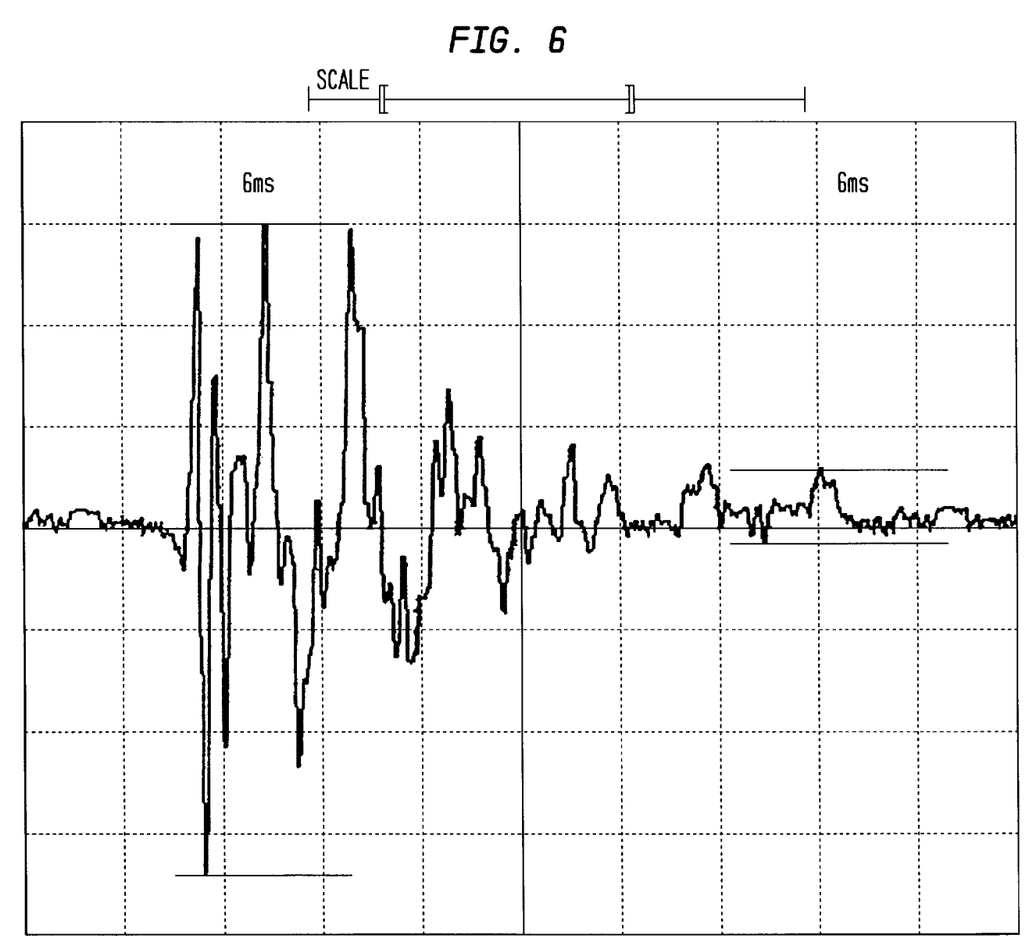
FIG. 6 represents the impulse response of a communication system when the tap states have normal values.

In accordance with our invention, the controller 80 electronically compares the tap state of the AEC 24 (and/or HEC 46), which reflects a sampling of the signal coupled from the microphone 12 or from the received signal d(n), to a template impulse response having characteristics of a "normal" response. Preferably, this is done in the digital domain. A normal or typical impulse response is illustrated in FIG. 6. In that figure, the tap or impulse response includes a strong signal component within the first six milliseconds representative of the direct echo path due to sound propagating from the speaker 58 through the air and the plastic of the speaker telephone 10 to the microphone 12. There are also signal components due to reflections from the wall and ceiling of the room in which the speaker telephone 10 is located, the result of these echoes being taps of smaller magnitude at the tail end of the impulse response, that is, after the first 6 milliseconds. The echo delays associated with reflections from walls on the ceiling extend outward for periods of time substantially longer than the response to the direct signal. In short, a rough impulse response shape to a properly trained speaker phone telephone 10 has large magnitude taps usually within the first 6 milliseconds, and taps of substantially smaller magnitude thereafter, as illustrated in FIG. 6, the relative magnitude of the taps over time being the determinative factor in assessing normalcy.

If the comparison results in a difference which exceeds a predetermined threshold, additional switched loss is inserted into the inactive signal path until the sampled tap state has returned to a "normal" range. By continuously sampling the impulse response, the loss can be removed just after the tap state has returned to the normal range. The controller 80 accesses the memory 68 in a read only manner; that is, the controller 80 does not affect the scaling factors stored therein, but rather is responsive to the values of the scaling factors to selectively and temporarily switch additional loss into the inactive signal path (the receive path when the speaker telephone 10 is in the transmit mode and the transmit path when the speaker telephone 10 is in the receive mode).

Figure 7:
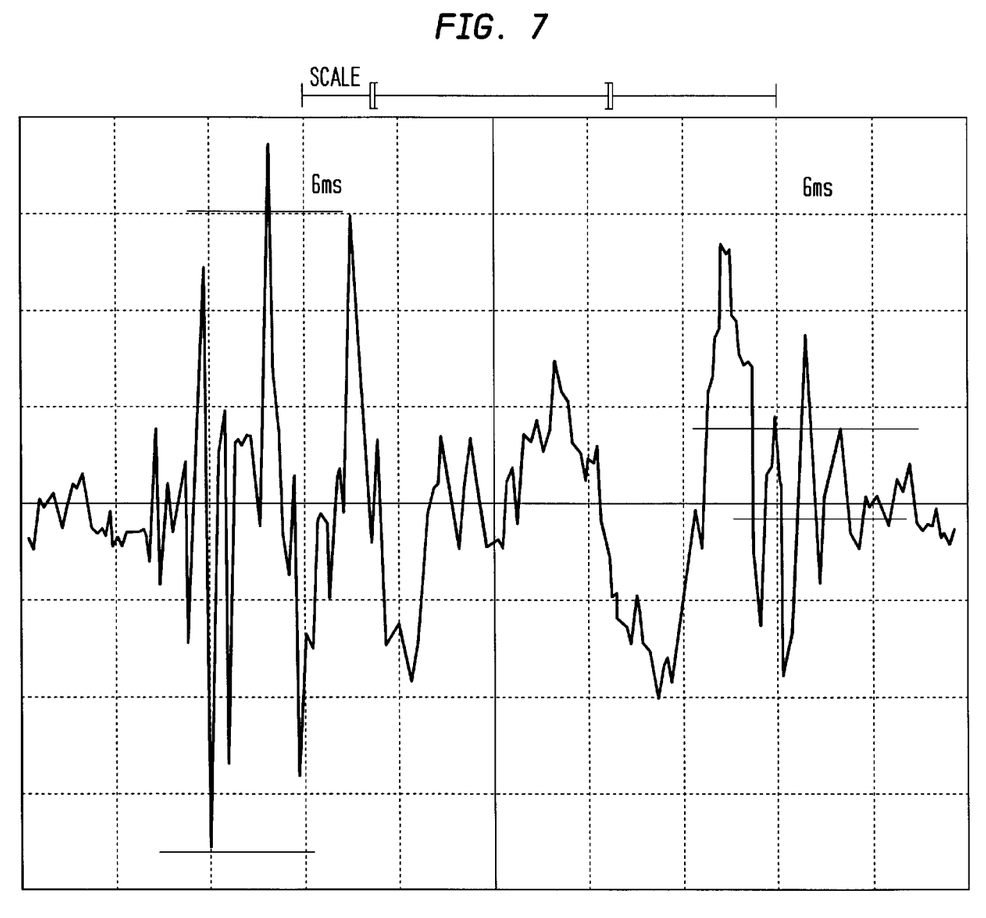
FIG. 7 represents the impulse response of a communication system when the tap states have abnormal values.

FIG. 7 illustrates an "abnormal" impulse response, in which there are large tap values near the tail end of the response. If the scaling factors stored in memory 68 are set in this manner, that would be indicative of the canceler having been temporarily improperly trained, for example, due to training in response to a dial tone or a rapidly changing room condition such as where a piece of paper momentarily passed close to the speaker telephone 10 and changed the direct path between the microphone 12 and the speaker 58. During times in which the controller 80 detects an abnormal tap state, additional switched loss is inserted into the inactive signal path (and switched out of the active path) until the sampled tap state returns to the "normal" range at which time the loss is removed. Because the cancelers are continuously being trained, abnormal conditions are typically temporary and the loss provided by attenuators 29 and 51 only temporarily affects the overall gain.

To better maintain loop stability, several approaches are described in connection with the flow diagrams of FIGS. 3–5 for detecting an abnormal tap state and restricting the insertion of loss by the attenuators 29 and 51 to times in which the abnormal tap state persists. The control algorithms of FIGS. 3–5 can be employed individually or serially in a particular implementation of the invention, as will be understood by those of skill in the art. The comparison of a present tap state of the canceler(s) may be with regard to a template, as described next, or to portions of one or more other impulse responses, described thereafter.

One technique for maintaining loop stability is illustrated in the flow diagram of FIG. 3. The method of FIG. 3 continuously samples signals in the active path to determine whether additional loss is to be inserted into, or removed from, the inactive path. At step 100, an impulse response (IR) is sampled or obtained from the memory 68 of the canceler in the active path. The controller 80 is programmed to divide, at step 102, the impulse response into at least first and second intervals. The sampled impulse response may be, for example, 17–35 milliseconds when the process flow is to affect acoustic echo cancellation and 10–12 milliseconds for hybrid echo cancellation. The absolute peak value over an interval is identified at step 104. With reference again to FIG. 6, two six-millisecond intervals are illustrated over which the peak value may be computed. Having identified the peak value over each interval, at step 106, the peak value over the first interval is scaled, for example by multiplying it by a predetermined constant (one, two, ½, etc.). Scaling the peak value over the first interval by multiplying it by a number less than one is equivalent to scaling the peak value over the second interval by multiplying that value by a number greater than one; either approach being within the scope of our invention.

In the process flow of FIG. 3, the template response is a specification of the relative levels of the peak tap values in each of the two intervals. In a particular specification, a normal response may be defined as having a peak tap value in the last six milliseconds (the second interval) which is not greater than the peak tap value in the first 6 milliseconds (the first interval), multiplied by a predetermined constant. If this specification is not met, that is, the comparison at step 108 fails (PV1'<PV2? "NO"), the tap state is abnormal and loss is inserted into the inactive path (by one of the attenuators 29 or 51) at step 110 and remains in the inactive path until the tap state is determined to be within the prescribed range of normal values. The process flow returns to step 100 to again sample the tap state of the memory 68 and thereby obtain another impulse response to analyze. When the scaled peak value over the first interval is determined at step 108 to be greater than the peak value over the second interval (PV1'<PV2? "YES"), then the loss previously inserted at 110 is removed at step 112, and the process flow returns to step 100.

To promote stability of the system, and avoid a circular insertion, removal and reinsertion of loss, a timer is preferably checked between step 112 and 108 to determine whether a preset period of time has elapsed since the last insertion of loss. The timer starts to count (either up or down to a predetermined value) upon insertion of loss at step 110, as shown at step 111. If an insufficient period of time has elapsed, instead of removing loss at step 112, the process instead obtains another sample at step 100. However, after a preset period of time has elapsed, for example, 10 milliseconds, when step 108 is satisfied (PV1'<PV2? "YES"), loss is removed from the inactive path at step 112, and the process flow returns to step 100.

Preferably, whenever loss is switched into the inactive path, an equal amount of loss is switched out of the active path such that the overall gain in the loop remains generally constant.

In FIG. 4, a more general process is illustrated for comparing the tap state to a reference template. As in the foregoing process flow, at step 130, an impulse response is sampled or obtained from the memory 68 of the canceler in the active path. A reference response characteristic is obtained from a data store, preferably within the controller 80, as shown at step 132. This reference response can be, for example, a rectified and/or smoothed rendition of a typical normal impulse response, for example a rectified and/or smoothed rendition of the response illustrated in FIG. 6. At step 134, the impulse response that was obtained at step 130 is compared to the stored reference response for normalcy. If the sampled response is abnormal, loss is inserted into the inactive path (by one of the attenuators 29 or 51) at step 136, a timer is started at step 137 and then the process loops back to the starting step of obtaining the impulse response (namely, step 130). On the other hand, if the sampled impulse response compares favorably to the reference response, then the impulse response has a normal characteristic and a decision is made as to whether loss should be removed at that time from the inactive path. As in FIG. 3, a test is made to see whether a preset period of time has elapsed since loss was last inserted into the system, as shown at step 138. If a sufficient period of time has not yet passed, the process flow loops back to step 130. Otherwise, loss is removed from the inactive path at step 140, and then the controller 80 loops to step 130.

While two sampling intervals are described, there can be an arbitrary number ("n") of intervals, as understood by those of skill in the art.

In use, it is not unusual for the acoustic path between the speaker 58 and the microphone 12 to change rapidly over time if objects are moved close enough to the speaker telephone 10 to affect the magnitude of the direct path of acoustic coupling. Such rapid changes in the acoustic path are a source of loop instability problems. Specifically, when an object is moved close to the speaker telephone 10, the magnitude of the direct coupling between the speaker 58 and the microphone 12 is increased, and this is manifested as rapidly increasing tap weights in the memory 68 of the AEC 24. The process flow of FIG. 5 illustrates one manner by which the controller 80 detects such a situation and still maintains loop stability.

The process flow of FIG. 5 starts at step 160. At step 162, an impulse response is sampled or obtained by the controller 80 the same as done in steps 100 and 130, described above. At step 164, the peak value over the present interval (e.g., six milliseconds) is determined. At step 166, the peak value from a preceding sampling interval is retrieved from a data store (not shown), for example, a data store within the controller 80. At step 168, the peak value for the present interval is compared to the preceding interval and, if an increase is detected at step 168 (PV1>PV0? "YES"), loss is inserted into the inactive path at step 170 and a timer is started at step 171. Prior to obtaining an additional impulse response, at step 172, the peak value for the interval just sampled is stored in the data store of the controller 80 for retrieval at step 166 the next time that the process flow advances between steps 162 through 168. Then, after step set 172, the process loops to step 162 where it again obtains the present impulse response (tap state of the canceler) and proceeds to compare that impulse response to the impulse response(s) in the data store.

In the event that the peak value over the present interval is not greater than the peak value over the prior interval (PV1>PV0? "NO"), a decision is made at step 174 as to whether loss should be removed from the inactive path, as described above. If the preset period of time has not elapsed since the last time that loss was inserted into the inactive path, then the process flow returns to step 172 without removing any loss and the current peak value is saved in the data store of the controller 80. Otherwise, at step 176, loss is removed from the inactive path and the process flow proceeds to step 172. The process flow of FIG. 5, therefore, enables sudden changes in the peak value to be readily accommodated by dynamic insertion and removal of loss in the path.

Preferably, the peak value of the present interval is compared to the peak value over the immediately preceding interval, although the invention is not so limited. The comparison may instead be based on a rate of change over time of one or more tap weights from the memory 68, by storing one several peak values and finding first derivatives over the sampling interval; the foregoing is merely illustrative of one form of analysis and data storage/retrieval that can occur at steps 164, 166, 168 and 172.

As will be understood by those of skill in the art, the controller 80 can be programmed to implement one or more of the process flows illustrated in FIGS. 3–5. For example, prior to the steps of obtaining impulse responses as illustrated at steps 100, 130, and 162, the controller can be programmed to cycle between the process flows of FIGS. 3–5 such that each process flow loops one or more times before control is passed to a next process flow.

When two echo cancelling speaker telephones 10 are connected through a Central Office (CO), four echo cancelers operate concurrently. Each speaker telephone 10 has a local closed loop formed by the acoustic and hybrid echo paths which must be kept stable by the local AEC and HEC 46. In addition there is an end-to-end acoustic-to-acoustic loop from the speaker 58 of one telephone 10, to that telephone's microphone 12, through the CO to the other telephone's speaker 58' to its microphone 12' and back through the CO to the first telephone's speaker 58, etc. In this loop, the total gain is made up of the sum of the transmit and receive gains of both speaker telephones 10 less some finite amount of loss in the CO, depending on the quality of the connection. The only echo cancellation provided in this acoustic-to-acoustic loop is by the two AECs 24. This type of configuration is the worst case setup for echo canceling speaker telephones, and there is a great potential for loop instability particularly if the receive signal path gain is high on both phones. If one of the two speaker telephones 10 could detect this situation, then a decision could be made by the controller 80 to insert more switched loss to keep the end-to-end loop stable.

Suppose one of the telephones 10 is in a transmit state. Then there are two potential echo paths seen by the local HEC 46 of that telephone, one is the local hybrid reflection, and the other is the acoustic reflection from the far-end telephone 10'. The delay associated with the hybrid reflection is very short, and depending on the connection, the far-end acoustic reflection has a much longer delay. In the absence of far-end echo, the HEC 46 impulse response will have large tap values within the first five or six milliseconds and very small tap values in the tail end (7 ms to 15 ms) of the impulse response. If large tap values are present in the tail of the impulse response, as described above, this is an indication that there is an unacceptably large amount of far-end echo in the system. Upon detecting this abnormality, the controller 80 inserts additional echo suppression by switching loss into the inactive signal path to rectify the situation.

Once the parameters for the acoustic echo canceler 24 and the hybrid echo canceler 46 have been set, they will remain set for the duration of the telephone call, yet will be varied dynamically as changes occur in the room due to movement of people or the like or in the line.

The communication system of the embodiment illustrated in FIGS. 1–2 may operate over conventional telephone lines, other communication lines including, but not limited to ground-based coaxial or other types of cables, or over a broadcast system such as a cellular-based communication system. In a purely digital system, the HEC 46 may not be needed.

Figure 8:
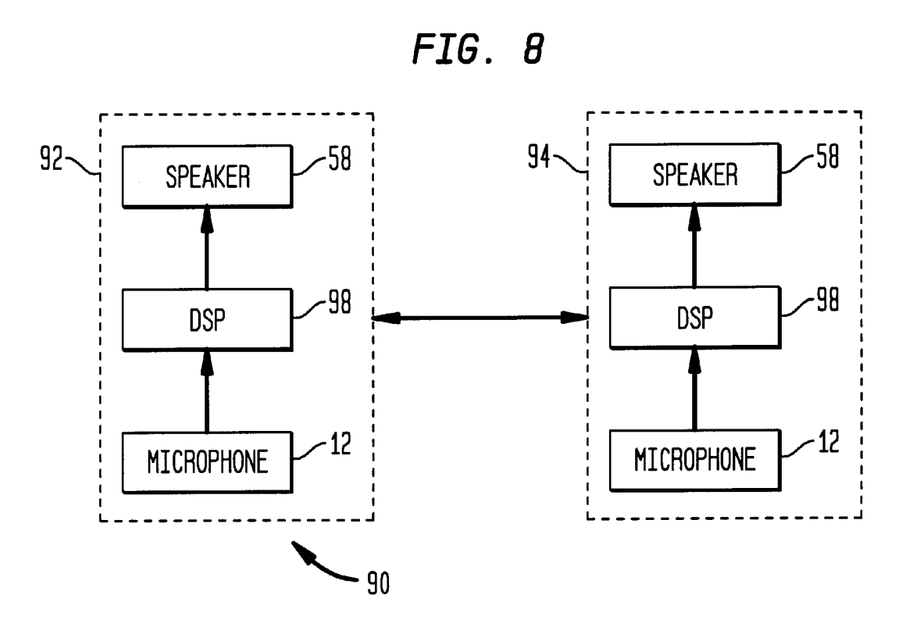
FIG. 8 is a simplified block-diagram of a communication system incorporating our invention.

All of the circuiting described above can be implemented using one or more integrated circuits. In FIG. 8, for example, a two-way communication system 90, which incorporates our invention, is illustrated in simplified block-diagram form. Like elements from the embodiment of FIG. 1 are accorded corresponding reference numerals. The system 90 includes devices 92, 94 at each end of a communication network 96 (illustrated as a two-directional communication line for simplicity), each of which includes a microphone 12 and a speaker 58 and is adapted to support two-way communication. The devices 92, 94 can be the same type of device (e.g., both telephones), or different (e.g., one is a computer or data processing terminal). The structure of the communication network 96 forms no part of the present invention. A digital signal processor (DSP) 98 performs the functions of the controller 80 as previously described. The DSP 98 can include as a single integrated circuit amplification capabilities, analog-to-digital and digital-to-analog conversion capabilities, an AEC 24, and a program executing the control functions of the controller 80. An HEC 46 can also be provided either on the DSP 98 or as a separate circuit if the communication network 96 or either of the devices 92, 94 does not support digital signal transfer.

Figure 9:
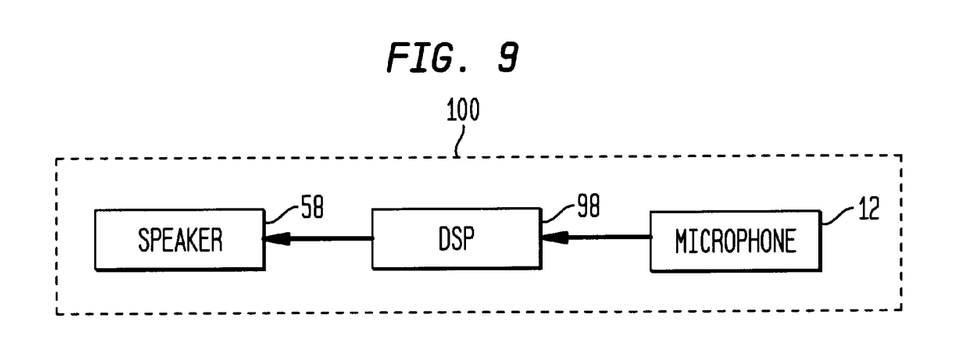
FIG. 9 is a simplified block-diagram of a one-way communication system adapted to recognize voice commands, in accordance with our invention.

As noted above, the tap profile of the impulse response can be used in one-way communications systems. With reference now to FIG. 9, a device 100 (e.g., a television or radio) having a speaker 58 for producing sound from a source (e.g., broadcast, cable, tape, or optical disc) (not shown) is further provided with a microphone 12 for receiving audible commands from a user. Audible commands from a user can be sent to the device 100 and isolated from signals emanating from the speaker 58 using the control scheme of our invention. In particular, the control functions of the controller 80, as implemented, for example, using the DSP 98 described above, cause signals from the speaker 58 to be cancelled to better isolate the commands coupled by the microphone 12 from the user. Specifically, the DSP 98 runs a program which analyzes the impulse response of the acoustic echo canceler 24 downstream of the microphone 12 and generates a control signal which is used to adjust a call programmable gain attenuator which selectively inserts loss into or removes loss from the microphone signal path. The isolated command from the user is then compared to pre-stored signals for identification. The identified command is then applied as a control signal to be applied to the device 100. The control signal can affect any of a number of settings including volume, bass, treble, channel or station, signal source, etc.

While an illustrative embodiment of our invention has been described above, it is, of course, understood that various modifications will be apparent to those of ordinary skill in the art. Such modifications are within the spirit and scope of our invention, which is limited and defined only by the appended claims.

We claim:

1. A method for controlling an amount of loss in signal paths of a communication system having an echo cancelling circuit, comprising the steps of:

sampling an impulse response of the echo cancelling circuit;

detecting an abnormal signal condition by comparing the impulse response to a reference response characteristic; and inserting loss into a first signal path when the abnormal signal condition is detected.

2. The method as in claim 1, including the further step of identifying a peak value within the impulse response, and wherein the detecting step comprises comparing the peak value to the reference response characteristic.

3. The method as in claim 2, wherein the reference is a peak value from a prior sampled impulse response.

4. The method as in claim 3 wherein a prior sampled impulse response is an immediately preceding sampled impulse response.

5. The method as in claim 1, wherein the reference is stored in a data store.

6. The method as in claim 1, wherein the impulse response is divided into first and second intervals.

7. The method as in claim 6, including the additional step of identifying the peak value within each of the first and second intervals, wherein the peak value in the second interval is the reference, and wherein the detecting step comprises comparing the peak value in the first interval to the reference.

8. The method as in claim 1, wherein the first signal path is a transmit signal path.

9. The method as in claim 1, including the additional step of removing loss from a second signal path in proportion to the loss inserted into the first signal path.

10. The method as in claim 9, wherein the loss removed from the second signal path is equal to the loss inserted into the first signal path.

11. The method as in claim 1, wherein the abnormal signal condition is an end-to-end loop condition.

12. The method as in claim 1, wherein the communication system is a one-way communication system and the first signal path carries a command signal.

13. The method as in claim 1, wherein the command signal carried on the first signal path is compared to pre-stored signals for a match, and the matched signal is applied as a device control signal.

14. A controller for adjusting an amount of loss in a signal path of a communication system having an echo cancelling circuit including a memory which stores a periodically updated impulse response comprising:

(a) an adjustable attenuator in the signal path having a control signal input;

(b) a memory which stores a reference response characteristic; and (c) a comparator having one input connected to the memory of the echo canceller circuit which samples the impulse response, another input connected to the memory which stores the reference response characteristic, and an output connected to the control signal input of the attenuator, the comparator comparing the signals at its inputs and outputting a control signal which selectively adjusts the attenuator to insert or remove loss in the signal path.

15. The controller as in claim 14, wherein the communication system is a one-way communication system and the signal path carries a command signal.

16. The controller as in claim 15, wherein the command signal carried in the signal path is compared to pre-stored signals for a match, and the matched signal is applied as a device control signal.

17. A controller for maintaining stability in a signal path of an echo cancelling communication system, comprising:
- a program running on a digital signal processor within the communication system, the program analyzing an impulse response of the echo canceller in comparison to a reference response characteristic and generating a control signal on the basis of said comparison; and
- a call programmable gain attenuator in the signal path responsive to the control signal to selectively insert or remove loss into the signal path.

18. The controller as in claim 17, wherein the communication system is a one-way communication system and the signal path carries a command signal.

19. The controller as in claim 18, wherein the command signal carried in the signal path is compared to pre-stored signals for a match, and the matched signal is applied as a device control signal.

20. The method as in claim 1, including the additional step of:
- providing an impulse response to the echo canceling circuit from a microphone connected to the communication system.

21. The controller as in claim 19, further comprising a device having:
- a digital signal processor running the program,
- an echo canceler in the signal path providing an impulse response for the program to analyze,
- a speaker emitting audible signals, and
- a microphone coupling to the echo canceler (1) the audible signals from the speaker and (2) an audible command from a user,
- the program generating the control signal for the call programmable gain attenuator to selectively insert or remove loss in the signal path to which the microphone is coupled.

22. The controller as in claim 21, wherein the device is responsive to the device control signal to control the device setting, the device setting being selected from the group consisting of: volume, bass, treble, channel, station, and signal source.

23. The controller as in claim 16, further comprising a device having:
- a digital signal processor running the program,
- an echo canceler in the signal path providing an impulse response for the program to analyze,
- a speaker emitting audible signals, and
- a microphone coupling to the echo canceler (1) the audible signals from the speaker and (2) an audible command from a user,
- the program generating the control signal for the call programmable gain attenuator to selectively insert or remove loss in the signal path to which the microphone is coupled.

24. The controller as in claim 23, wherein the device is responsive to the device control signal to control the device setting, the device setting being selected from the group consisting of: volume, bass, treble, channel, station, and signal source.

25. The method as in claim 1, wherein the sampling step occurs over a time period and wherein the reference response characteristic comprises a specification of tap values during one or more intervals of the time period.

26. The controller as in claim 14, wherein the comparator samples the impulse response over a time period, and wherein the reference response characteristic comprises a specification of tap values during one or more intervals of the time period.

27. The controller as in claim 17, wherein the comparator samples the impulse response over a time period, and wherein the reference response characteristic comprises a specification of tap values during one or more intervals of the time period.

* * * * *